(12) United States Patent
Wolf

(10) Patent No.: US 8,456,052 B2
(45) Date of Patent: Jun. 4, 2013

(54) ELECTRIC MACHINE WITH A MULTI-LEVEL WINDING

(75) Inventor: Gert Wolf, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 678 days.

(21) Appl. No.: 12/063,260

(22) PCT Filed: Jul. 6, 2006

(86) PCT No.: PCT/EP2006/063928
§ 371 (c)(1),
(2), (4) Date: Oct. 26, 2009

(87) PCT Pub. No.: WO2007/017322
PCT Pub. Date: Feb. 15, 2007

(65) Prior Publication Data
US 2010/0033052 A1 Feb. 11, 2010

(30) Foreign Application Priority Data
Aug. 9, 2005 (DE) .......................... 10 2005 037 463

(51) Int. Cl.
*H02K 15/04* (2006.01)
*H02K 3/12* (2006.01)

(52) U.S. Cl.
USPC ........... 310/207; 310/180; 310/208; 310/201; 310/203; 310/187; 29/596; 29/605

(58) Field of Classification Search
USPC ................. 310/180, 207, 201, 184, 198, 203, 310/208, 187; 29/596, 605
See application file for complete search history.

(56) References Cited

U.S. PATENT DOCUMENTS

| | | | |
|---|---|---|---|
| 5,299,749 A * | 4/1994 | Thorogood et al. | 242/437.3 |
| 6,337,529 B1 | 1/2002 | Higashino et al. | |
| 6,727,625 B2 * | 4/2004 | Ooiwa | 310/184 |
| 6,770,999 B2 * | 8/2004 | Sakurai | 310/208 |
| 6,979,926 B2 * | 12/2005 | Ogawa et al. | 310/180 |
| 7,868,507 B2 | 1/2011 | Bodin et al. | |
| 2001/0019234 A1 | 9/2001 | Murakami et al. | |
| 2002/0017825 A1 * | 2/2002 | Oohashi et al. | 310/207 |
| 2002/0036439 A1 * | 3/2002 | Ooiwa | 310/207 |
| 2002/0043886 A1 | 4/2002 | Fujita et al. | |
| 2003/0015932 A1 * | 1/2003 | Oohashi et al. | 310/201 |
| 2003/0230949 A1 * | 12/2003 | Ogawa et al. | 310/180 |

FOREIGN PATENT DOCUMENTS

| | | |
|---|---|---|
| DE | 102 08 566 | 9/2003 |
| EP | 1 122 861 | 8/2001 |
| EP | 1 179 880 | 2/2002 |
| EP | 1 381 140 | 1/2004 |
| EP | 1 416 610 | 5/2004 |
| JP | 61-240832 | 10/1986 |
| JP | 2002-58189 | 2/2002 |
| JP | 2002-176752 | 6/2002 |
| WO | 2007/003834 | 1/2007 |

* cited by examiner

*Primary Examiner* — Tran Nguyen
*Assistant Examiner* — Terrance Kenerly
(74) *Attorney, Agent, or Firm* — Michael J. Striker

(57) ABSTRACT

Stator winding (10) for an electric machine, in particular for a generator of a motor vehicle, the stator winding (10) being embodied as an ordered stator winding (10), and the stator winding (10) being embodied in at least two axially spaced-apart levels (22, 24) in a winding head (13). The invention also relates to an electric machine and a method for manufacturing a stator winding (10) of an electric machine.

12 Claims, 2 Drawing Sheets

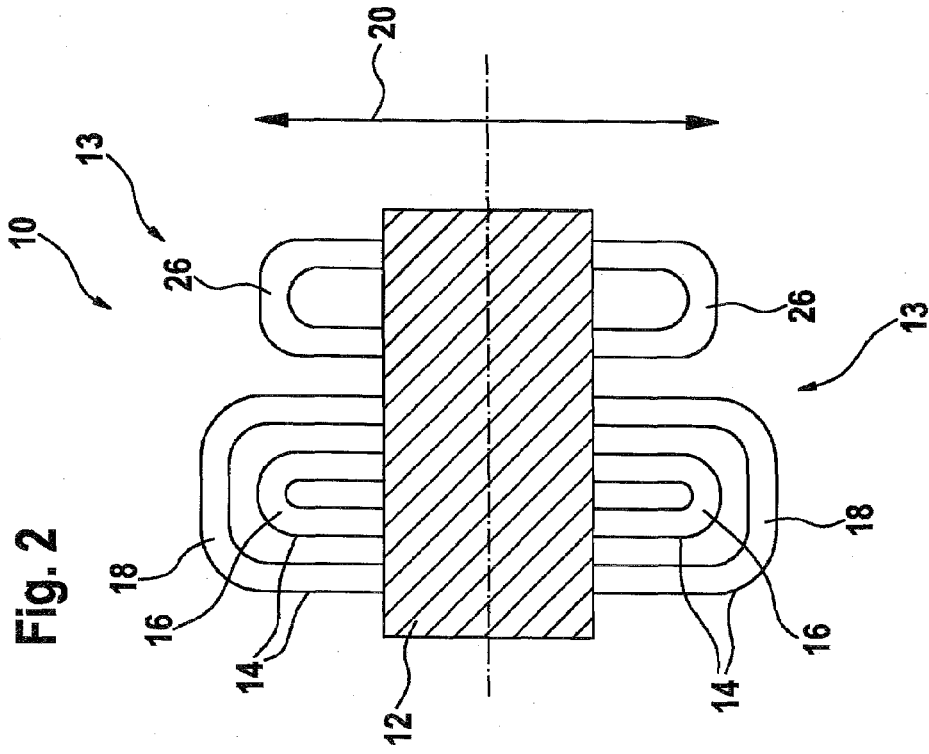
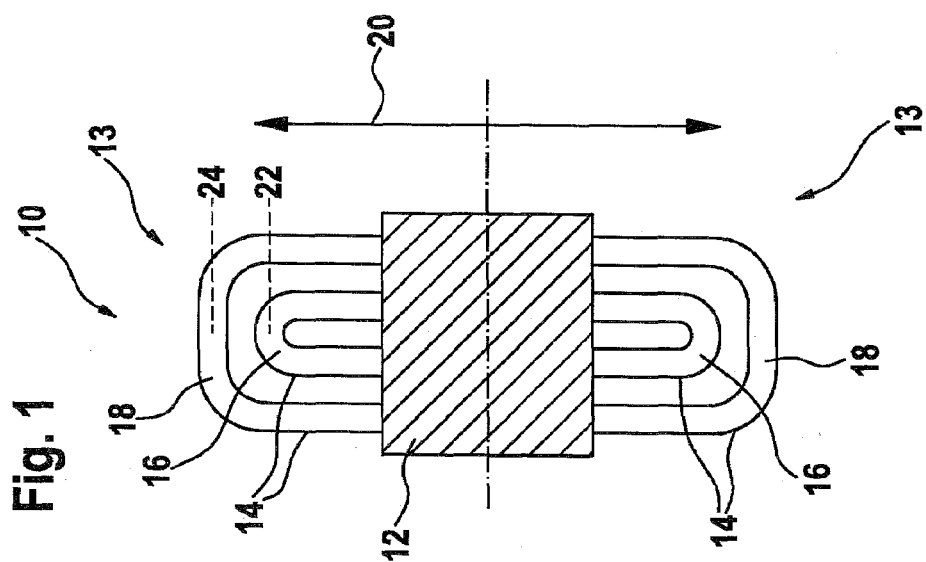

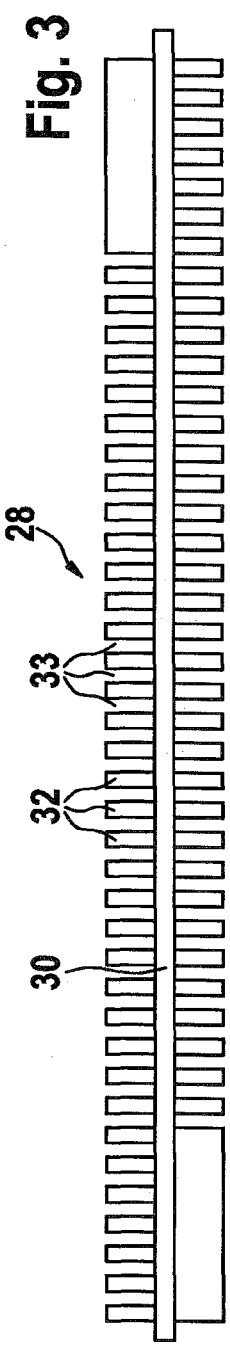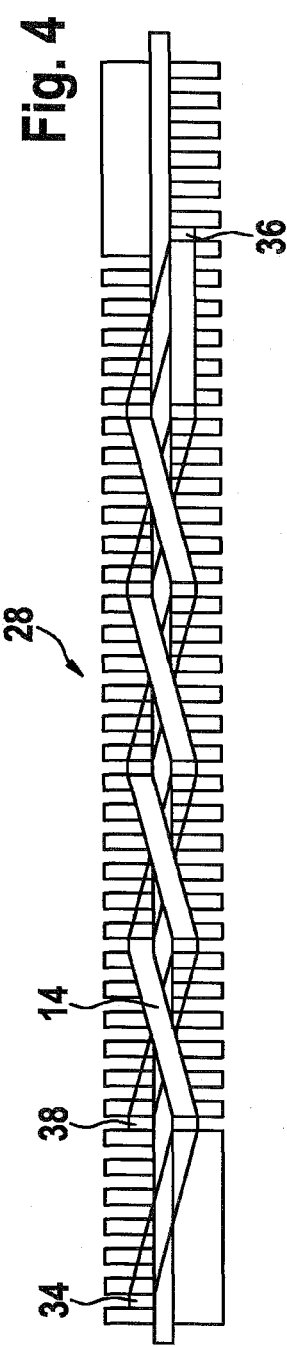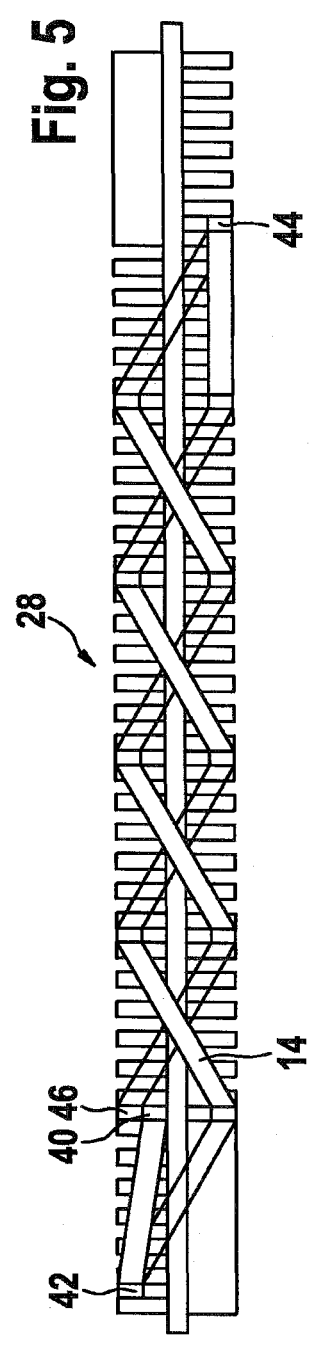

ELECTRIC MACHINE WITH A MULTI-LEVEL WINDING

The invention relates to a stator winding for an electric machine—in particular for a generator of a motor vehicle, an electric machine with a stator winding, and a method for manufacturing a stator winding of an electric machine.

PRIOR ART

Electric machines according to the preamble to claim 1 are known from the prior art. They are operated as electric motors, electric generators, or in the case of alternating operating states, are operated as an electric motor for part of the time and as an electric generator for part of the time. Of particular interest in this connection is the use of an electric machine as a generator in a motor vehicle. Because of increasing power demands inside a motor vehicle and the limited amount of available space, there is a constant need for the development of electric machines that function efficiently, are compactly constructed, and have a long life expectancy.

ADVANTAGES OF THE INVENTION

In a stator winding for an electric machine, in particular for a generator of a motor vehicle, according to the present invention, the stator winding is embodied in the form of an ordered winding and the stator winding is produced in a winding head in at least two levels spaced axially apart from each other. The term axial is understood to refer to the rotation axis of the electric machine into which the stator winding is inserted. A stator winding embodied in this way results in a structured, well-ventilated winding head that has advantageous mechanical properties and stable electrical properties. The winding head with the stator winding can be used both in a round-shaped sheet packet (open slot) and in a flat packet. The term "flat packet" is understood to mean that the stator packet lies flat when the windings of the stator packet are introduced. It is then bent to form a round stator packet, whereupon the abutting junction points are usually welded. Since the stator winding is embodied as ordered, the part held in the winding head can be definitely shaped in each production step. In addition, trials have shown that the use of such a stator winding produces only slight current noise at high speeds. It should be expressly noted that the stator winding can also be embodied with more than two levels. If it is a winding head with an essentially symmetrical structure on two sides, then in the context of the present invention, please note that that levels on both sides should not be added together, but should instead be located on at least one of the two sides, in particular on both sides.

The stator winding advantageously has an inner winding and an outer winding, with the outer winding encompassing the inner winding. This yields a favorable structure that already enjoys the advantages of the present invention. In this case, it is not necessary for the outer winding to encompass the inner winding completely. Instead, it is sufficient if the outer winding encompasses the inner winding partially.

According to a modification of the present invention, the stator winding is embodied in the form of a wave winding and in particular, has at least one reversal point. Such a winding can be easily manufactured and because it continues at the reversal points, permits there to be a smaller number of conductors still needing to be connected in another step.

Preferably, at least one phase of the stator winding is produced from a one-piece, continuous conductor. This yields a further simplification of the manufacturing process.

It is also preferable for the inner and outer windings to be oriented in the same direction. This means that the routing of the respective wire extends in the same direction, i.e. is parallel to a certain extent.

The stator winding is advantageously composed of a rectangular wire and in particular, the stator space factor is greater than 55%.

As is known, the stator space factor is the ratio of the sum of all conductor cross sections without insulation (i.e. in particular the copper cross sections) in a groove to the total cross-sectional area of the groove. The use of a rectangular wire makes it possible to achieve a particularly high stator space factor; a high stator space factor in turn yields a particularly favorable efficiency of the machine. Furthermore, in conjunction with the wire/conductor, the teeth of the stator perform a clamping function so that slippage is prevented during the insertion of the wires and during subsequent operation.

According to a modification of the invention, the conductor has swages in the winding head. It is possible to produce swages and/or crimps of the conductor, in particular a copper wire, since all of the conductors/wires are accessible during the winding process.

The stator winding is advantageously inserted into a flat packet or into a stator with open grooves.

It is also advantageous if the stator winding is embodied with round wire and the wire sections that come to rest inside the grooves of the stator pack are swaged. This can take place in an intermediate step or in a final step. In this way, the wires assume the shape of the groove.

It is also preferable that the width of the wires of the winding approximately corresponds to the groove width. As a result, no wires are situated next to one another; this reduces or eliminates the danger of crossed wires or a slippage of wires.

The present invention also relates to an electric machine, in particular for a motor vehicle, equipped with a stator winding having one or more of the above-mentioned defining characteristics.

In this case, it is advantageous if the machine has more than three phases. The ratio of the wire width b to the number s of phases is approximately $$b \text{ (s phases)} = b \text{ (3 phases)} \cdot (3 \text{ phases}/s \text{ phases})$$

It is therefore possible to use narrower wires that are easier to bend. This simplifies the manufacture and the shaping of the winding head.

Finally, the present invention also relates to a method for manufacturing a stator winding of an electric machine, in particular for a motor vehicle; according to the present invention, at least one inner winding is manufactured and then one outer winding spaced axially apart from the inner winding is manufactured around the inner winding. The term "axial" is understood once again to refer to the rotation axis of the electric machine into which the stator winding is inserted. This produces a winding that is bulky in the axial direction. If it should be necessary, the bulkiness in the axial direction can be compensated for by a corresponding shortening of the inner winding heads. This approach has the advantage that the winding can be continuously wound with all of the phases at the same time. The advantages of such a method become evident particularly with the fact that a continuous conductor can be used and that crimps and/or swages can be introduced during the manufacturing process.

The stator winding is advantageously manufactured by means of a rotating winding mandrel. This permits an inexpensive production since it is no longer necessary to use a multitude of winding devices. It is particularly advantageous if all of the phases are wound at the same time since this reduces the winding times.

Finally, it is preferable if the winding process continues at least once on the same side of the winding mandrel and/or if a crimping and/or swaging of the wires occurs at least once on the winding mandrel.

Other advantageous embodiments of the method are disclosed in the dependent claims.

DRAWINGS

The invention will be explained in greater detail below in conjunction with exemplary embodiments.

FIG. 1 shows a first exemplary embodiment of a two-level stator winding in a winding head, FIG. 2 shows a second exemplary embodiment of a two-level stator winding in a winding head, FIG. 3 shows a simplified, systematic depiction of a winding bar, FIG. 4 shows the production of an inner winding on the winding bar, and FIG. 5 shows the production of an outer winding on the winding bar.

DESCRIPTION OF THE EXEMPLARY EMBODIMENTS

FIG. 1 shows a sectional view of a part of a stator winding 10 for an electric machine, in particular for a generator of a motor vehicle. The stator winding 10 is embodied as an ordered stator winding 10 and is secured in a stator packet 12, which is depicted in a sectional view. The stator winding 10 has a conductor/wire 14 that is used to form an inner winding 16 and an outer winding 18, respectively, on two sides of the stator packet 12, i.e. in the winding head 13. In the selected depiction, it is clear that the outer winding 18 respectively encompasses the inner winding 16. If one considers the axial span (symbolized by the arrow 20) of the stator packet 12 and the stator winding 10, then it is clear that the inner winding 16 extends to a first level 22 and the outer winding 18 extends to a second level 24. In this case, the levels 22, 24 are spaced apart from each other in the axial direction. The inner winding 16 and outer winding 18 here are oriented in the same direction.

In a once again simplified fashion, FIG. 2 shows a part of a stator winding 10 that is held in a stator packet 12. In this regard, the explanations relating to FIG. 1 apply here as well. FIG. 2 shows that it is also possible for a plurality of windings 16, 18, 26 to be wound onto and/or next to one another, in particular wound axially onto one another and wound radially next to one another. Although not shown here, it would also be possible to encompass the winding 16, 26 with an additional windings.

In conjunction with FIGS. 3, 4, and 5, an example of how the proposed stator winding can be manufactured will now be demonstrated. To that end, first, FIG. 3 symbolically depicts a winding bar 28 with a central bridge piece 30, a large number of struts 32 and the grooves 33 situated between them.

FIGS. 4 and 5 then show how the inner winding 16 (FIG. 4) and the outer winding 18 (FIG. 5) are wound onto the winding bar 28. The front side of the winding bar 28 (the side visible here) shows the connection side (B side) with the connecting wires, while the rear side constitutes the drive side (A side). In order to more clearly represent the course of the one-piece conductor 14, the conductor 14 is shown in two different variants: when the conductor 14 covers the central bridge piece 30 and/or the struts 32 in the graphic depiction, then this means that the conductor 14 is extending along the B side. If the conductor 14 is only depicted with two lines so that the central bridge piece 30 and the struts 32 are once again visible, then this shows that the conductor 14 is extending along the A side. As is clearly visible in FIG. 4, starting from an inner winding starting point 34, the conductor 14 is routed in an alternating wave-shape across the A side and B side to an inner reversal point 36. Here, the conductor 14 switches over from the B side to the A side and is then once again routed in an alternating wave-shape across the A side and the B side to an inner winding end point 38 of the inner winding 16.

Then FIG. 5 shows the manufacture of the outer winding 18. For the sake of better visibility, the inner winding 16, which has already been produced, is not shown here again, even though the inner winding 16 and outer winding 18 are naturally produced on one winding bar 28. As has already been described above, the conductor 14 in this case is advantageously embodied of one piece so that the end point 38 of the inner winding coincides with the starting point 40 of the outer winding. Starting from this point, the conductor 14 is routed to a reversal point 42. From there, the conductor 14 is routed in an alternating wave-shape across the A side and B side to an outer reversal point 44. Here, the conductor 14 switches over from the B side to the A side and from there, is once again routed in an alternating wave-shape across the A side and B side to the other winding end point 46. This explains the principle of the manufacture of a multi-level stator winding 10.

The manufacturing process for a stator winding 10 generally equipped with s phases will be described in detail below. It is assumed here that at the beginning, s winding beginnings are inserted into the first s grooves. The manufacture of the first half of the inner winding then occurs as follows:

1. Rotation of the winding bar by 180° and simultaneous shifting of the wire feeds by s grooves to the right.
2. Insertion of the wires into the grooves s+1 through 2 s.
3. Rotation of the winding bar by 180° and simultaneous shifting of the wire feed by s grooves to the right.
4. Insertion of the wires into the grooves s+1 through 2 s.
5. Repetition of these steps until the end of the winding bar is reached.
6. When the end of the winding bar is reached, the rotation of the winding bar is omitted. Next comes an advance by s grooves and insertion of the last s wires once again on the same side of the winding bar.
7. If necessary, the shaping of the winding head by means of tools can now be carried out.

The manufacture of the second half of the inner winding occurs analogously to the manufacture of the first half, but this time, working toward the other end of the winding bar. After the inner winding is complete, the outer winding is produced according to the same principle. When the winding is completely finished, the winding is taken from the winding bar and is swaged so that in the subsequent installed state, it is not bulky in the axial and/or radial direction.

What is claimed is:

1. A method for manufacturing a stator winding (10) of an electric machine as a wave winding, comprising steps of:
   manufacturing an inner winding (16) using a rotating winding mandrel in a winding process; and
   manufacturing an outer winding (18) around the inner winding (16) so that the outer winding (18) is spaced axially apart from the inner winding (16) using the rotating winding mandrel in the winding process, to form the wave winding;

wherein the inner winding (16) and the outer winding (18) are formed of one piece of wire;

wherein the winding process continues at least once on the same side of the winding mandrel to a reversal point of the stator winding, which is embodied as a conductor (14) of one piece, and wherein when an end of the wiring mandrel is reached during the winding process, a rotation of the winding mandrel is omitted.

2. The method as recited in claim 1, wherein a continuous wire is used.

3. The method as recited in claim 1, wherein the wire is swaged before the winding.

4. The method as recited in claim 3, wherein the wire is formed as round wires.

5. The method as recited in claim 1, wherein all wire sections of a groove are swaged at the same time.

6. The method as recited in claim 5, wherein the width of the wire corresponds approximately to the width of the groove.

7. The method as recited in claim 6, wherein the wire is round wire.

8. The method as recited in claim 5, wherein all wire sections of the groove are embodied as round wires.

9. The method as recited in claim 1, wherein a cross-sectional shape of the wire is at first essentially round and is changed in a subsequent step.

10. The method as recited in claim 9, wherein the change of the cross-sectional shape occurs in the groove region in order to adapt the shape of the wire to the shape of the groove and to achieve a high stator space factor.

11. The method as recited in claim 1, wherein electrical machine is a motor vehicle.

12. A method for manufacturing a stator winding (10) of an electric machine as a wave winding, comprising steps of:

manufacturing an inner winding (16) using a rotating winding mandrel in a winding process; and manufacturing an outer winding (18) around the inner winding (16) so that the outer winding (18) is spaced axially apart from the inner winding (16) using the winding mandrel in the winding process, to form the wave winding;

wherein the winding process continues at least once on the same side of the winding mandrel to a reversal point of the stator winding, which is embodied as a conductor (14) of one piece, while a crimping or swaging of the wire occurs at least once on the winding mandrel, or both; and wherein when an end of the wiring mandrel is reached during the winding process, a rotation of the winding mandrel is omitted.

* * * * *